United States Patent [19]
Whitney

[11] Patent Number: 5,533,556
[45] Date of Patent: Jul. 9, 1996

[54] ROUTER GUIDE APPARATUS

[76] Inventor: David Whitney, 34 Woodland Rd., Rochester, Mass. 02770

[21] Appl. No.: 383,307

[22] Filed: Feb. 3, 1995

[51] Int. Cl.⁶ .................. B27M 3/00; B27C 5/00
[52] U.S. Cl. .............. 144/144.52; 33/403; 33/415; 83/471.3; 83/473; 144/372; 144/144.1
[58] Field of Search ............ 144/134 D, 136.6, 144/144 R, 144.5 R, 144.5 GT, 144 A, 134 R, 371, 372; 83/574, 471.3, 472, 473; 409/130, 125, 182, 185; 33/403, 415, 429, 430, 562, 568

[56] References Cited

U.S. PATENT DOCUMENTS

| | | | |
|---|---|---|---|
| 2,752,961 | 7/1956 | Melgaard | 144/136 C |
| 3,104,689 | 9/1963 | Piper et al. | 144/136 C |
| 4,062,123 | 12/1977 | Lundquist | 144/144.5 R |
| 4,630,656 | 12/1986 | Collins | 144/136 C |
| 4,769,920 | 9/1988 | O'Connor, Jr. | 144/144.5 R |
| 5,052,454 | 10/1991 | Meinhardt | 144/144.5 GT |

Primary Examiner—W. Donald Bray
Attorney, Agent, or Firm—John P. McGonagle

[57] ABSTRACT

A router guide comprising a channeled track with a fixed fence attached at a top surface of a first end and a moveable fence slideably attached between the first end and the second end. The track affixes to one side of the workpiece and a router attached to a circular disk is manually slid between the fences to cut slots in the workpiece. The fences are rotatable to a plurality of angles to the track. A pair of router stops may be attached to the fences to limit the sliding motion of the router.

20 Claims, 5 Drawing Sheets

ROUTER GUIDE APPARATUS

BACKGROUND OF THE INVENTION

The present invention relates generally to router guides, and more particularly to a device that is attached to a workpiece and is used to guide a router in a specific predefined cutting path.

Routers are used in the woodworking trades to make straight cuts along a lengthwise dimension and/or a widthwise dimension of a workpiece. The movable powered router is a powerful tool capable of making precise edges and decorative designs as well as dadoes and grooves. Powered hand held routers have become a common woodworking tool used by both professionals and hobbyists.

The powered hand router is, however, difficult to keep in a straight line and to control when cutting without some pattern or guide due to the differing density of the workpiece and warped or non straight workpieces. Much time is usually spent making customized guides or patterns for specific router cutting operations. These custom guides then need to be attached to the workpiece by separate clamping means.

Several devices exist in the art to help a router make straight cuts in a workpiece. These devices generally consist of a table with a router and guidance system for the router. The table is attached to at least two sides of the workpiece. A track system generally runs over the workpiece and the router is slideably attached to the track system and slides over and cuts the top surface of the workpiece.

These systems can be very large in order to attach to two opposite sides or edges of the workpiece. The large size of the table and track systems make these devices nonportable. This lack of portability requires that the workpiece be brought to the fixed location router device. These devices are generally found in woodworking shops only, and are quite expensive and not cost justifiable for an individual who does not utilize the device daily. These devices are also limited by their size to the size of the workpieces on which they can be utilized. If the workpiece is larger than the device, the device cannot be utilized, because these devices generally affix to two opposite sides of the workpiece.

In addition to the large size of the existing art, prior art systems are generally complex and require many time consuming adjustments in order to ready the table to make router cuts. These devices take time to learn how to use properly and accurately and then require substantial time in adjusting in preparation for making a router cut. They are not time efficient in making several different sized cuts or in making cuts in a multitude of different workpieces because of the set up and adjustment time required.

Once a prior art systems is set up and a first cut made, e.g., in a lengthwise workpiece direction, the whole fixture must be disassembled and reassembled and readjusted in order to make a widthwise cut in the workpiece. The workpiece must be removed and turned on the table and then reattached on two sides.

A device that can be used to make straight cuts in both a length and width direction, that is portable, and easily attached to workpieces of many different sizes would be most useful. This device should not be limited by the size of the workpiece, and not so complicated as to be expensive. A device fitting these qualifications would be of great help to everyone from the weekend woodworker to the full time carpenter and other individuals needing a portable, accurate, easily utilized, and inexpensive router guide.

Pre-fabricated customized router guides have been previously suggested. See for example, U.S. Pat. Nos. 5,052,454; 4,840,209; 4,770,216; 4,742,853; 4,718,468; 4,630,657; 4,434,824; 4,215,731; 3,985,168; 3,910,327; 3,827,468; 3,782,431; 3,442,309; 3,003,827; and U.S. Pat. No. 2,957, 507.

While such devices may each serve a limited purpose, there still exists a need for a simple, easily useable, portable router guide that can cut variable width precise length cuts longitudinally, transversely, and at angles on workpieces and that can clamp directly onto workpieces. None of the previously suggested router guides can meet all of these requirements. For the foregoing reasons, there is a need for a simple, light weight, portable, inexpensive router guide.

SUMMARY OF THE INVENTION

In view of the foregoing disadvantages inherent in the art of router devices, the present invention provides an apparatus that will make a multitude of different angled router cuts in workpieces of nearly unlimited size. As such the general purpose of the present invention, which will be described subsequently in greater detail, is to provide a router guide which affixes to one side of a workpiece; is adjustable to many different angles; is simple to use and adjust; is of a small size; is readily portable; and is not limited to workpieces of a certain size.

To attain this, the present invention provides an adjustable double fence router guide used primarily for cutting joints of various configurations such as but not limited to dado and rabbit joints. The present invention consists of a fence track for holding the fences; workpiece clamps for securing the track to a workpiece; a fixed fence for defining one side of workpiece cuts; a movable fence which moves along the track for defining variable width cuts; fence mounts which attach the fences to the track for allowing cuts at various angles and; adjustable stops for precise length cuts in the workpiece.

The present invention is designed to be a light-weight tool that is portable and clamp onto material stock. It also allows for router cuts in both the longitudinal and transverse directions with adjustable double fences for router control. The present invention has adjustable stops that enable accuracy in router cut length without overcutting. The dual fence system pivots in a socket for angular cuts that can be controlled manually without the need for re-positioning the guide on the workpiece. There is a width adjustment to allow the router to make routs of various desired widths. This width adjustment is accomplished by the movable fence which can be slid on the track for width adjustment also without re-positioning the guide on the workpiece. The present invention accomplishes the functions of the previous router guides in a compact, light-weight, and complete unit.

A first object of the invention is to provide a device that will accurately guide a router in making cuts in a workpiece.

Another object of the invention is to provide a device that is relatively inexpensive to produce and cost justifiable to a wide target market.

It is yet another object of the invention to provide a device that is portable such that it can be used on a construction job site in addition to a weekend craftsman's basement.

It is a still further object of the invention to provide a router guiding device that is simple to use and does not require a large amount of time to utilize accurately.

It is another object of the invention to provide a device that is not limited to specific direction of router cuts nor to a specific size of a workpiece.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Referring to the drawings in detail, wherein like numbers indicate like elements, there is shown a router guide apparatus 1 comprised generally of a track 10; a fixed fence 30; a movable fence 50; and two router stops 90. The router guide 1 is used in conjunction with a router 5 and a workpiece 2. The router 5 is attached to a router plate 6. With the exception of the router plate 6, all structural components are made preferably from T 6061 gauge aluminum. The router plate 6 is made from one-half inch thick lexan. For purposes of exposition, it will be assumed that the workpiece 2 is generally rectangular and flat, having an upper surface 4 and an undersurface 3. The fixed fence 30, movable fence 50, and two router stops 90 are positioned across the workpiece upper surface 4.

Figure 5:
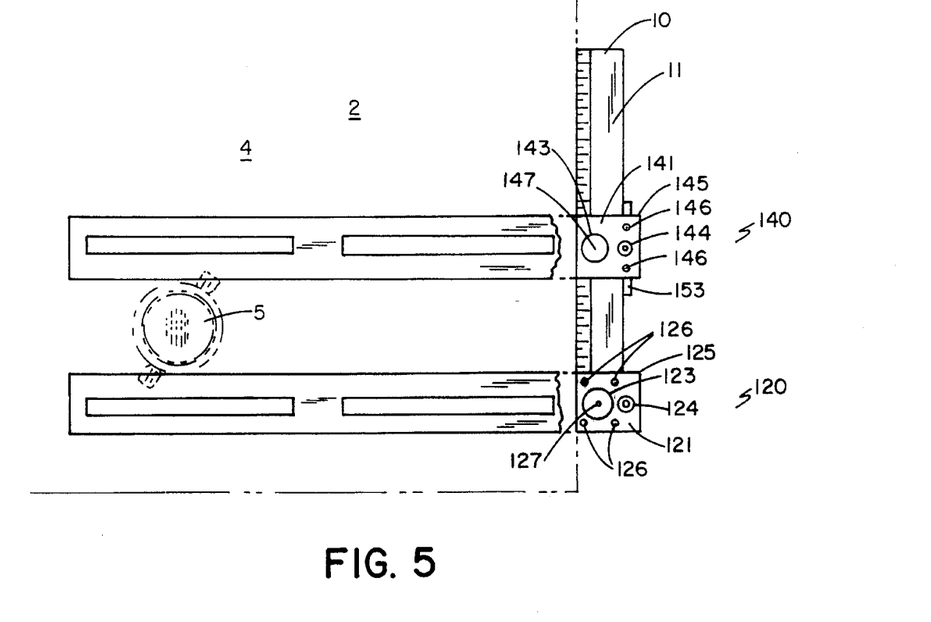
FIG. 5 is a top view of the fence track without the fences in place.
Figure 10:
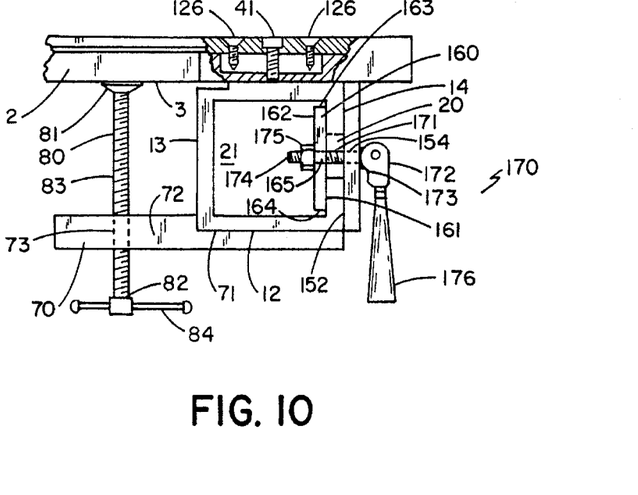
FIG. 10 is a side view, partly in section of the fence track.

The track 10 is comprised of an elongated, rigid, hollow and substantially rectangular shaped stock having a horizontal top surface 11 and bottom surface 12, two vertical sides 13, 14, and two open ends, one end being defined as the proximal end 15, and the other end being defined as the distal end 16. One side 14 (hereinafter the slot side) has an evenly spaced opening forming a track slot 20 running the entire length of the slot side 14. The side directly opposite the track slot side 14 is referred to as the fence side 13. The longitudinal axis of the track 10 is from end to end 15, 16. The track's hollow interior 17 forms a track channel 21. The top surface 11 has measuring indicia 18 formed in or on it for defining cut width. The measuring indicia 18 is formed along fence side 13 of the top surface 11.

Figure 1:
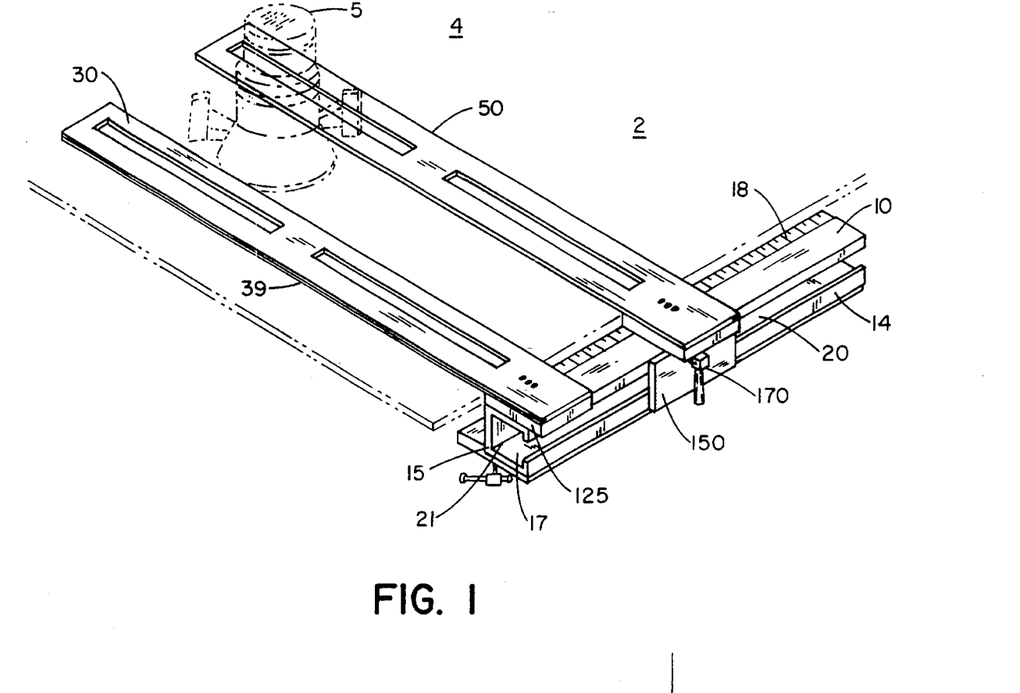
FIG. 1 is a perspective view of a router guide apparatus constructed in accordance with the present invention shown in use on a workpiece with guide fences at a 90° angle to the fence track.
Figure 2:
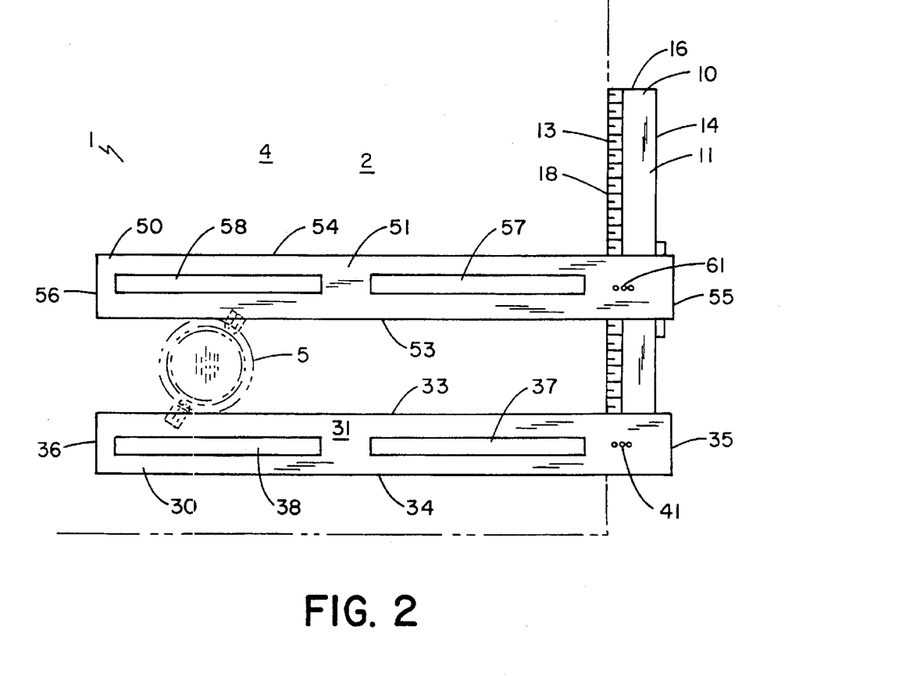
FIG. 2 is a top view of the guide of FIG. 1.
Figure 3:
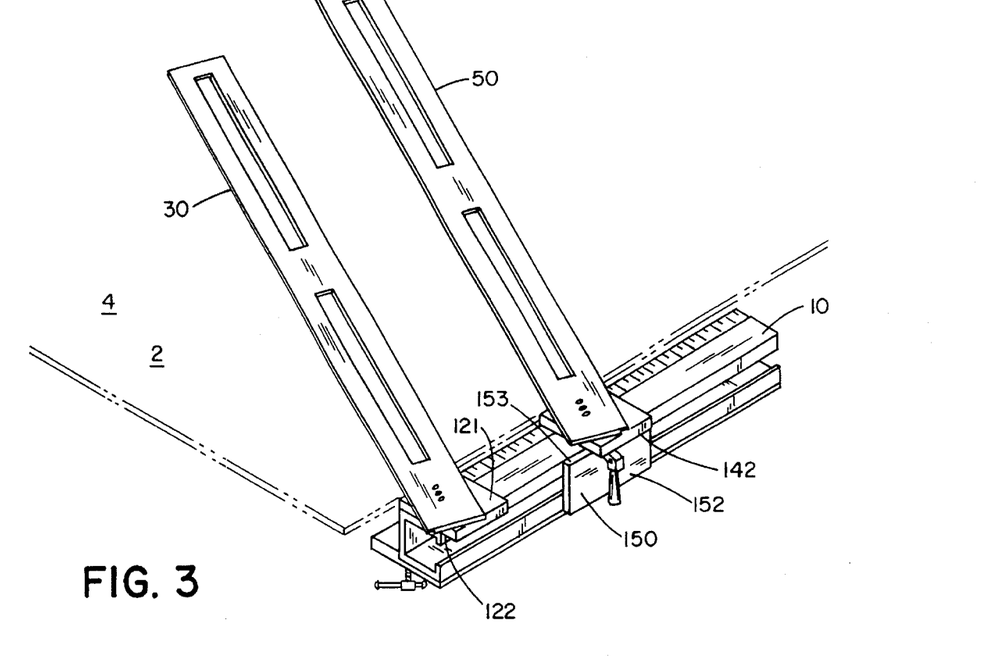
FIG. 3 is a perspective view of the FIG. 1 guide with guide fences at an acute angle to the fence track.
Figure 4:
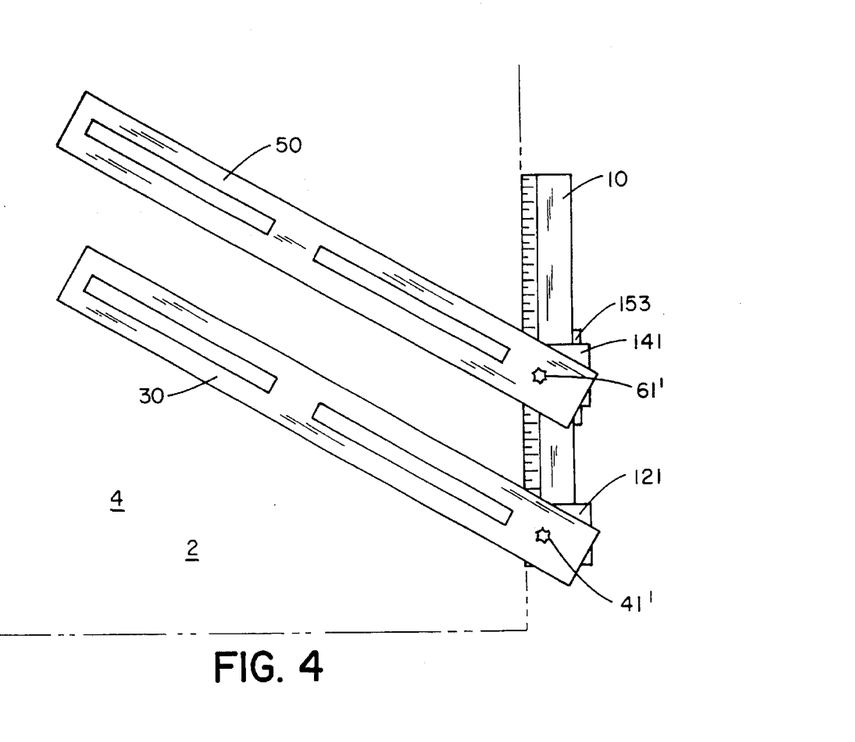
FIG. 4 is a top view of FIG. 3.

The track 10 is secured to a workpiece 2 by means of a plurality of attachment plates 70 and work piece clamps 80. Each attachment plate 70 is a generally rectangular shaped plate with a flat step shaped notch 71 formed therein to fit the bottom surface 12 of the track 10. The attachment plates 70 are attached to the bottom surface 12 of the track 10 and lie in horizontal planes generally parallel to the plane of the track bottom surface 12. The longitudinal axis of each attachment plate 70 is transverse to the longitudinal axis of the track 10. The length of each attachment plate 70 is longer than the width of track 10. Each attachment plate 70 extends from the slot side 14 of the bottom surface 12, across the bottom surface 12, past and away from the fence side 13 in a plane generally parallel to the plane of the bottom surface 12. The portion of each attachment plate 70 extending away from the track bottom surface 12 is defined as the attachment plate extension portion 72. Each attachment plate extension portion 72 has a vertical, cylindrical, threaded hole 73 formed therein.

Each workpiece clamp 80 has an elongated, generally cylindrical shape, a work piece engaging end 81, a handle end 82, and a threaded surface 83. Each clamp 80 is vertically positioned and threadingly engages the attachment plate extension portion vertical, cylindrical, threaded hole 73. The clamp 80 is positioned so that the workpiece engaging end 81 is vertically above the hole 73 and the handle end 82 is vertically below the hole 73. The clamp handle end has a handle 84 attached thereto which is adapted to axially rotate the clamp 80. Axial rotation of the clamp 80 causes interaction between the clamp threaded surface 83 and the threaded hole 73 thereby resulting in vertical movement of the clamp 80 so that the clamp engagement end 81 presses against the undersurface 3 of the workpiece 2.

Figure 6:
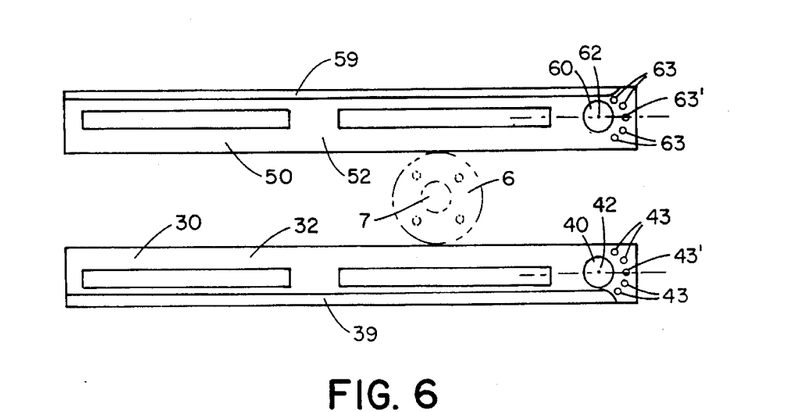
FIG. 6 is a bottom view of the fences.
Figure 7:
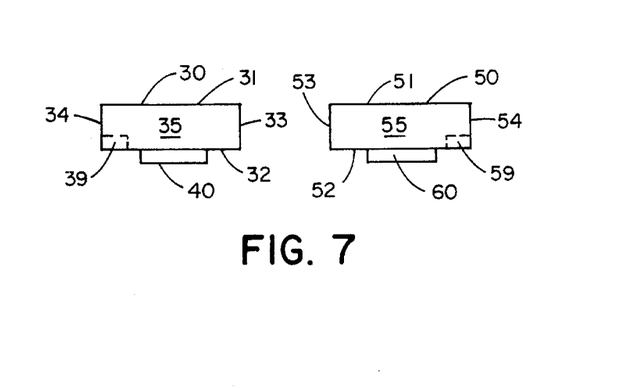
FIG. 7 is an end view of a fence.

The router guide track 10 has a fixed fence 30 and a movable fence 50 attached to its top surface 11. The fixed fence 30 and the movable fence 50 are mirror images of one another. Both fences 30, 50 are flat, rectangular pieces each having a longitudinal axis which is substantially longer than its transverse axis. The fixed fence 30 has a top surface 31, bottom surface 32, inner edge 33, outer edge 34, proximal end 35, and distal end 36. The fence end which will be closest to the track 10 when the router guide 1 is assembled is referred to as the proximal end 35 and the opposite end as the distal end 36. For convention, the inner edge 33 of the fixed fence 30 is the edge closest to the movable fence 50 when the router guide 1 is assembled. The fixed fence 30 has two elongated viewing slots, proximal 37 and distal 38, cut through from the top surface 31 to the bottom surface 32, along the central longitudinal axis of the fixed fence 30. The fixed fence outer edge 34 contains an elongated, channel notch referred to as fence channel 39 at the junction of the outer edge 34 and bottom surface 32. The fence channel 39 extends along the bottom surface 32 outer edge 34 from near the fence proximal end 35 to the fence distal end 36. The fence channel 39 is designed to engage the router stops 90 described in more detail below.

The movable fence 50 has a top surface 51, bottom surface 52, inner edge 53, outer edge 54, proximal end 55, and distal end 56. The fence end which will be closest to the track 10 when the router guide 1 is assembled is referred to as the proximal end 55 and the opposite end as the distal end 56. For convention, the inner edge 53 of the movable fence 50 is the edge closest to the fixed fence 30 when the router guide 1 is assembled. The movable fence 50 also has two elongated viewing slots, proximal 57 and distal 58, cut through from the top surface 51 to the bottom surface 52, along the central longitudinal axis of the movable fence 50.

The movable fence outer edge 54 contains an elongated, channel notch referred to as fence channel 59 at the junction of the outer edge 54 and bottom surface 52. This fence channel 59 is also designed to engage the router stops 90 described in more detail below.

The fixed fence 30 is joined to the track 10 by means of a fixed fence mount 120 attached to the track top surface 11 near to the track proximal end 15. The fixed fence mount 120 is a generally rectangular shaped plate having an upper surface 121 and a bottom surface 122. The mount bottom surface 122 rests on the track top surface 11. The mount top surface 121 has a cylindrical aperture, referred to as the rotation void 123, formed therein. The fixed fence mount 120 is positioned so that its longitudinal axis is transverse to the longitudinal axis of the track 10. The fixed fence mount longitudinal axis is longer then the width of the track top surface 11. The fixed fence mount 120 is attached to the track top surface 11 flush with track fence side 13. The fixed fence mount 120 overhangs on the track slot side 14. There is an upraised detent 124 formed on the fixed fence mount top surface 121. The detent 124 is located on the central longitudinal axis of the mount 120 in a line from the center of the rotation void 123, said line being perpendicular to the track longitudinal axis. The detent 124 is positioned on the track slot side overhang portion 125 of the mount top surface 121.

The movable fence 50 is joined to the track 10 by means of a movable fence mounting assembly 130 attached to the track 10. The assembly 130 is comprised movable fence mount 140 fixedly attached to a lock plate 150, which is joined to a back plate 160 by means of a fence lock 170. The movable fence mount 140 is a generally rectangular shaped plate having an upper surface 141 and a bottom surface 142. The mount bottom surface 142 slidably rests on the track top surface 11. The mount top surface 141 has a cylindrical aperture, referred to as the rotation void 143, formed therein. The movable fence mount 140 is positioned so that its longitudinal axis is transverse to the longitudinal axis of the track 10. The movable fence mount longitudinal axis is longer then the width of the track top surface 11. The movable fence mount 120 is positioned on the track top surface 11 flush with track fence side 13. The movable fence mount 120 extends over the track slot side 14. There is an upraised detent 144 formed on the movable fence mount top surface 141. The detent 144 is located on the central longitudinal axis of the mount 140 in a line from the center of the rotation void 143, said line being perpendicular to the track longitudinal axis. The detent 144 is positioned on the track slot side overhang portion 145 of the mount top surface 141.

The moveable fence mount 140 is fixedly attached to a lock plate 150 and slideably positioned on the top surface 11 of the track 10. The lock plate 150 has a generally rectangular shape and a longitudinal axis parallel with the longitudinal axis of the track 10. The lock plate 150 has a forward surface 151, a rearward surface 152, and a top side 153 which defines the thickness of the plate 150. The plate 150 is vertically positioned in a plane parallel to the track slot side 14. The plate rearward surface 152 is positioned against the track slot side 14 and has a vertical width wider than the vertical width of the track slot 20, and approximately equal to the vertical width of the slot side 14. The movable plate track slot side overhang portion 145 of the mount bottom surface 141 is fixedly attached to the lock plate top side 153. The lock plate 150 has a central hole 154 formed through the thickness of the plate from the forward surface 151 through to the rearward surface 152.

The back plate 160 has a generally rectangular shape and a longitudinal axis parallel with the longitudinal axis of the track 10. The back plate 160 has a forward surface 161, a rearward surface 162, a top side 163 and a bottom side 164, said top and bottom sides 163, 164 defining the thickness of the back plate 160. The plate 160 is vertically positioned in a plane parallel to the track slot side 14 within the track channel 21 with a width small enough to fit flush between the inner surfaces of the track channel 21. The plate forward surface 161 is positioned against the track slot 20 and has a vertical width greater than the vertical width of the slot 20. Like the lock plate 150, the back plate 160 has a central hole 165 formed through the thickness of the plate from the forward surface 161 through to the rearward surface 162.

The lock plate 150 and back plate 160 are joined by means of a fence lock 170. The fence lock 170 is comprised of a threaded shaft 171 with two ends, a proximal end 173 and a distal end 174, said distal end 174 terminating in a locking head 172. The distal end 174 of the shaft 171 is inserted through the lock plate hole 154 from forward surface 151 to rearward surface 152 so that the locking head 172 remains externally adjacent to the lock plate forward surface 151. The shaft 171 is positioned through the track slot 20, into and through the back plate hole 165 from forward surface 161 through to rearward surface 162. A locking nut 175 is attached to the fence lock threaded shaft distal end 174 thereby engaging the threaded shaft 171 and being tightened so that the nut 175 presses against the back plate rearward surface 162. The fence lock locking head 172 is adapted to release pressure holding the back plate 160 to the locking plate 150 along the threaded shaft 171 by manipulation of the locking head handle 176. The fence lock 170 slideably attaches the back plate 160 and the lock plate 150 to the track 10 at a user defined position relative to the fixed fence mount 120. The movable fence mount 140 can be moved along the track 10 when attached via the lock plate 150, the back plate 160 and the fence lock 170. The lock plate 150 is engaged against the track slot side 14 of the track 10 when the fence lock shaft 171 is passed through the lock plate hole 154, the track slot 20, and the back plate hole 165. The fence lock 170 is then engaged to hold the lock plate 150 to the track slot side 14 of the track 10.

The movable fence mount 140 is fixedly attached to the upper end of the lock plate 150 by means of two screws 146. The movable fence mount 140 is identical to the fixed fence mount 120 except that the fixed fence mount is fixedly attached to the track top surface 11 by means of four screws 126.

The fixed fence 30 has a rotation disk 40 attached to its bottom surface 32 near to its proximal end 35. The movable fence 50 also has a rotation disk 60 attached to its bottom surface 52 near to its proximal end 55. Each rotation disk 35, 55 is a cylindrical plate with an outer diameter slightly smaller then the inner diameter of the fixed fence mount rotation void 123 and movable fence mount rotation void 143. The fixed fence 30 is joined to the fixed fence mount 120 by insertion of the rotation disk 35 into the rotation void 123 and fastening one to the other by means of a rotation screw 41 inserted through the fixed fence 30, through the center 42 of the rotation disk 40, through the center 127 of the rotation void 123 into the fixed fence mount 120. The movable fence 50 is attached to the movable fence mount 140 in the same manner. The movable fence 50 is joined to the movable fence mount 140 by insertion of the rotation disk 60 into the rotation void 143 and fastening one to the other by means of a rotation screw 61 inserted through the movable fence 50, through the center 42 of the rotation disk 62, through the center 147 of the rotation void 143 into the movable fence mount 140. The rotation screws 41, 61 rotatably attach the fences 30, 50 to the fence mounts 120, 140.

The fixed fence 30 bottom surface 32 contains five detent holes 43 arranged about the proximal side of the rotation disk 40 between the disk 40 and the fixed fence proximal end 35. The detent holes 43 are located at predetermined angular positions radially from the rotation disk center 42. Other embodiments of the invention may have more or less detent holes 43. A first detent hole 43' is located in a line from the center 42 of the rotation disk 40 concentric with the central longitudinal axis of the fence 30. One pair of detent holes 43 are located ±30° from the first detent hole relative to the gate central longitudinal axis. The remaining pair of detent holes 43 are located ±45° from the first detent hole 43' relative to the gate central longitudinal axis. Other embodiments of the invention may have different spacing of detent holes 43. When the fixed fence 30 is installed on the fixed fence mount 120, the mount detent 124 can be aligned with a detent hole 43 to set the fixed fence 30 in a desired angular position relative to the longitudinal axis of the track 10.

The movable fence bottom surface 52 also contains five detent holes 63 arranged about the proximal side of the rotation disk 60 between the disk 60 and the movable fence proximal end 55. The detent holes 63 are also located at predetermined angular positions radially from the rotation disk center 62. Other embodiments of the invention may have more or less detent holes 63. A first detent hole 63' is located in a line from the center 62 of the rotation disk 60 concentric with the central longitudinal axis of the movable fence 50. One pair of detent holes 63 are located ±30° from the first detent hole 63' relative to the gate central longitudinal axis. The remaining pair of detent holes 63 are located ±45° from the first detent hole 63' relative to the gate central longitudinal axis. Other embodiments of the invention may have different spacing of detent holes 63. When the movable fence 50 is installed on the movable fence mount 140, the mount detent 144 can be aligned with a detent hole 63 to set the movable fence 50 in a desired angular position relative to the longitudinal axis of the track 10.

Figure 11:
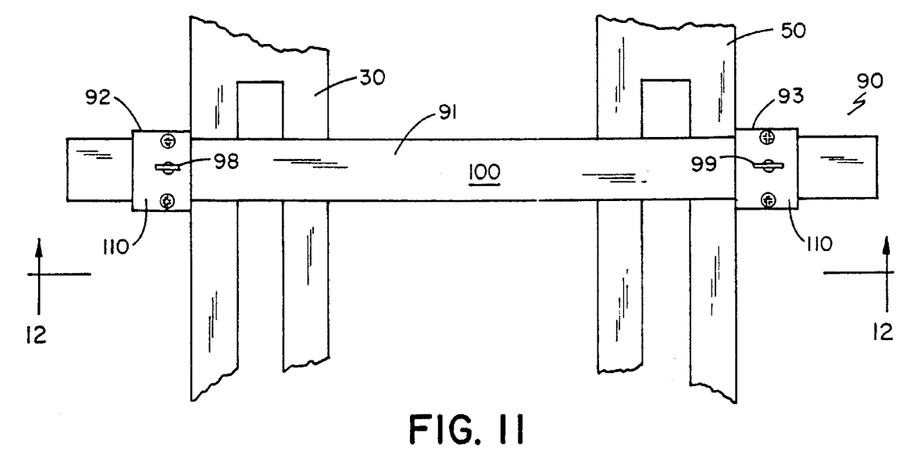
FIG. 11 is an expanded top view of one of the router stops shown in FIG. 9.
Figure 12:
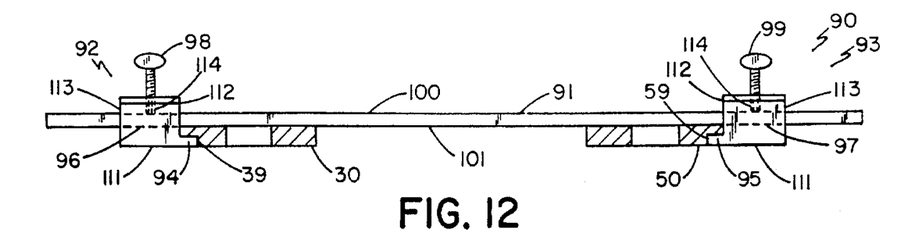
FIG. 12 is a side view of the router stop of FIG. 11 along the line 12—12.

The router guide 1 also contains two router stops 90, which are installed as desired. The router stops 90 have identical structures. Each router stop 90 is made up of a flat, elongated, plank-shaped member 91, a first stop clamp 92, and a second stop clamp 93. The members 91 are rectangular pieces each having a longitudinal axis which is substantially longer than its transverse axis. Each member 91 has a top surface 100, bottom surface 101, inner edge 102, outer edge 103, first end 104, and second end 105. The first stop clamp 92 and the second stop clamp 93 are essentially rectangular blocks. Each clamp 92, 93 has a horizontal top surface 110, horizontal bottom surface 111, vertical interior side 112, and a vertical opposite exterior side 113. The interior sides 112 of the clamps 92, 93 are defined as those sides facing each other. Each clamp 92, 93 has a horizontal flange 94, 95 formed along its interior side 112 at its bottom surface 111. Each flange 94, 95 has a cross-sectional dimension slightly less than the cross-sectional dimensions of the fixed and movable fence channels 39, 59. The flange 94 of the first stop clamp 92 engages the fixed fence channel 39 and the flange 95 of the second stop clamp 93 engages the movable fence channel 59.

Each clamp 92, 93 has a slot cut 96, 97 through from the interior side 112 to the exterior side 113. Each slot 96, 97 has a cross-sectional dimension slightly greater than the cross-sectional dimension of the member 91. The slots 96, 97 form a rectangular opening for slideably engaging the member 91. The first and second stop clamps 92, 93 have holes 14 drilled into their top surfaces 110 down to the slots openings 96, 97. Adjustment screws 98, 99, for first and second stop clamps 92, 93, respectively, are fitted into these holes 114 for holding the member 91 in a desired position.

Figure 8:
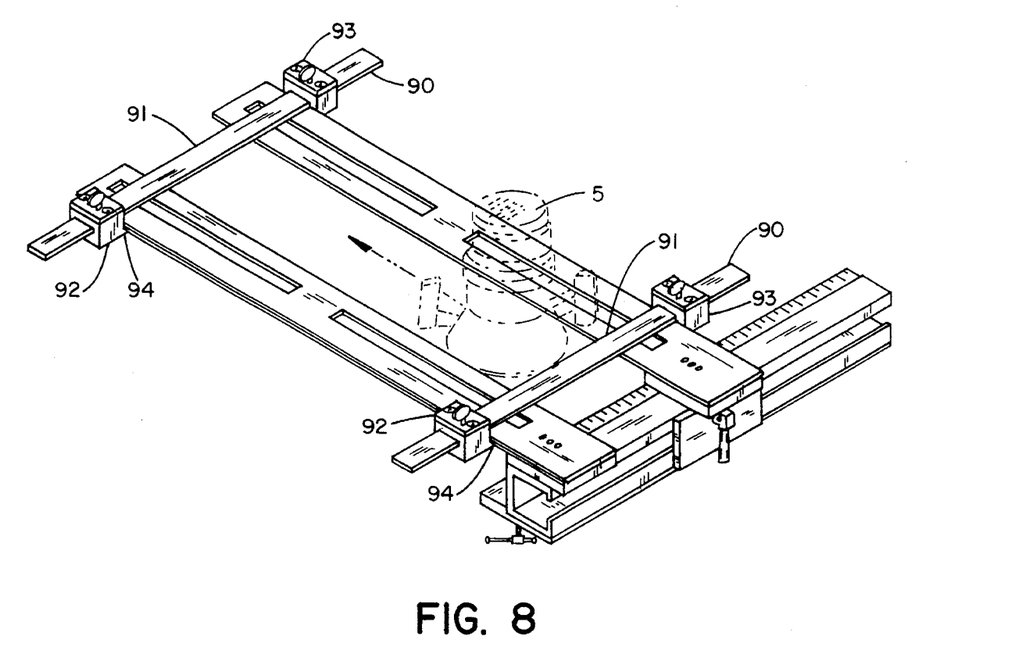
FIG. 8 is a perspective view of the guide of FIG. 1 with two router stops installed.
Figure 9:
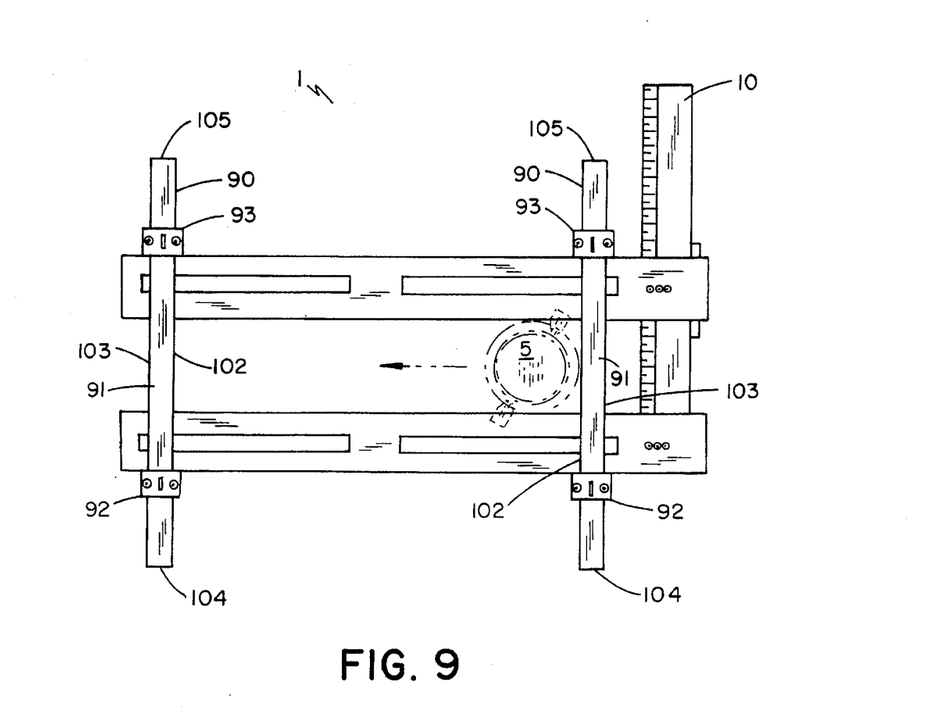
FIG. 9 is a top view of the guide of FIG. 8.

When needed, the router stops 90 are installed over the fixed fence 30 and movable fence 50 perpendicular to each fence longitudinal axis. The adjustment screws 98, 99 are loosened and the first and second stop clamps 92, 93 moved away from each other along the member 91 to allow the router stop 90 to be placed over the fixed fence 30 and movable fence 50 at a desired position along the lengths of the fences 30, 50. The first stop clamp 92 and the second stop clamp 93 are then slid inwardly toward each other on the member 91 until flanges 94, 95 engage with fence channels 39 and 59. The adjustment screws 98, 99 are then tightened to hold the stops 90 in position over the fences 30, 50.

For best operation of the router guide 1 the router 5, itself, is mounted onto a one-half inch thick circular lexan router plate 6. The router plate 6 has a bit void 7 through which a router bit (not shown) passes. In operation, the router plate 6, rather than the router 5 itself, will come in contact with the router guide 1 components.

In operation, the movable fence 50 is slid along the track 10 via the lock plate 150 and the back plate with fence lock 170 loosened. When the desired cut width is reached, the fence lock 170 is manually engaged. The work piece 2 is positioned against the track 10 and clamped with work piece clamps 80 against the fixed fence 30 and the movable fence 50. The cut angle is set by pivoting the fixed fence 30 and the movable fence 50 to the detent position at the desired angle. The router 5 with the installed router plate 6 is placed between the fixed fence 30 and the movable fence 50. The router 5 is energized and guided along between the fixed fence 30 and movable fence 50 to achieve the desired workpiece 2 cut.

If further cuts are needed on the workpiece 2 after the original cut, the fence lock 170 is unlocked and the movable fence 50 and movable fence mount 140 are slid along the track 10 to define the width of the second cut. While the router guide 1 is installed on the workpiece 2, a cut of a different angle may be achieved by pivoting fixed fence 30 and movable fence 50 to change the detent position to define a different angle workpiece 2 cut.

If an identical cut is needed on another workpiece, the router guide 1 is unclamped from the original workpiece 2 and clamped to the new workpiece without changing the fence width and angle position settings. The router 5 can then be used on the new workpiece to achieve an identical cut.

If a specific cut length is desired, the router stops 90 are installed over the fixed and movable fences 30, 50. The first stop clamp 92 and the second stop clamp 93 of the first stop 90 are loosened via adjustment screws 98 and 99. The clamps 92, 93 are moved outward and away from each other along the member 91. The router stop 90 is placed over the fixed fence 30 and the movable fence 50. The first stop clamp 92 and the second stop clamp 93 are moved inwards on the member 91 to engage the flanges 94, 95 with the fence channels 39, 59. The adjustment screws 98, 99 are tightened to hold the router stop 90 to the fences 30, 50. The second router stop 90 is installed in a similar fashion onto the fences 30, 50 to define the desired length of the cut. The energized router 5 with router plate 6 installed is moved from one router stop 90 to the other router stop 90 between the fixed fence 30 and the movable fence 50. When the second router stop 90 is reached, the router plate 6 comes into contact with the stop member 91 to define the end of the fixed length workpiece 2 cut. illustrative of the application. Other embodiments may be readily devised by those skilled in the art which will embody the principles of the invention and fall within the spirit and scope thereof. As may be best seen in FIG. 4, in an alternative embodiment, the rotation screws 41, 61, shown in FIGS. 1, 2 & 3, may be replaced with threaded screws having knobs 41', 61' attached.

I claim:

1. In combination with a router attached to a router plate, an adjustable double fence router guide apparatus for guiding said router on a horizontally-oriented workpiece having an upper surface and an undersurface, comprising:

a horizontal, fence track attached to said workpiece, said fence track having two fence mounts each adapted to pivotally attach a fence to said fence track, one said mount being a fixed mount in a fixed position on said fence track and the other said mount being a movable mount on said fence track relative to said fixed fence mount;

a horizontal, fixed fence positioned on said workpiece upper surface, said fixed fence defining one side of a workpiece cut and being pivotally attached to said fence track fixed mount;

a horizontal, movable fence positioned on said workpiece upper surface parallel to said fixed fence, said movable fence defining another side of a workpiece cut and being pivotally attached to said fence track movable mount; and two horizontal, adjustable, router stops, positioned over said workpiece, attached to said fence track.

2. A router guide apparatus as recited in claim 1, wherein:

said fence track is comprised of an elongated, rigid, hollow and substantially rectangular shaped stock having a horizontal top surface, horizontal bottom surface, two vertical sides, and two open ends, one end being defined as the proximal end, and the other end being defined as the distal end, said ends defining the longitudinal axis of said track, one said vertical side, termed the slot side, having an evenly spaced opening forming a track slot running the horizontal length of said slot side, the said vertical side directly opposite the track slot side being termed the fence side, said track's hollow interior forming a track channel.

3. A router guide apparatus as recited in claim 2, wherein:

said fence track is attached to said workpiece by means of a plurality of attachment plates and work piece clamps, each said attachment plate being a generally rectangular shaped plate with a flat step shaped notch formed therein to fit said bottom surface of said fence track, said attachment plates being attached to the bottom surface of the fence track and lying in horizontal planes generally parallel to the plane of the fence track bottom surface, each said attachment plate having a longitudinal axis transverse to the longitudinal axis of the fence track, each said attachment plate having a length longer than a side-to-side width of the fence track, each said attachment plate extending from the slot side of the fence track bottom surface, across said bottom surface, past and away from the fence side in a plane generally parallel to the plane of said bottom surface, said attachment place having a portion, termed the attachment plate extension portion, extending away from the track bottom surface, each said attachment plate extension portion has a vertical, cylindrical, threaded hole formed therein.

4. A router guide apparatus as recited in claim 3, wherein:

each said workpiece clamp has an elongated, generally cylindrically-shaped, a work piece engaging end, a handle end, and a threaded surface, each said clamp being vertically positioned and adapted to threadingly engage an attachment plate extension portion vertical, cylindrical, threaded hole, each said clamp being positioned so that the workpiece engaging end is vertically above the hole and the handle end is vertically below said hole.

5. A router guide apparatus as recited in claim 4, wherein each said workpiece clamp is further comprised of:

a handle attached to said clamp handle end, said handle being adapted to axially rotate said clamp, wherein axial rotation of said clamp causes interaction between the clamp threaded surface and the threaded hole thereby resulting in vertical movement of the clamp so that the clamp engagement end presses against said workpiece undersurface.

6. A router guide apparatus as recited in claim 5, wherein:

said fixed and movable fences are flat, rectangular pieces each having a longitudinal axis which is substantially longer than its transverse axis, said fences being mirror images of one another.

7. A router guide apparatus as recited in claim 6, wherein:

said fixed and movable fences each have a top surface, bottom surface, inner edge, outer edge, proximal end, and distal end, said fence end closest to the fence track being referred to as said proximal end and the fence opposite end as the distal end, said fence inner edge being the edge closest to the other fence, each said fence also having two elongated viewing slots, proximal and distal, cut through from the top surface to the bottom surface, along a central longitudinal axis defined by said two ends, each said fence outer edge containing an elongated, channel notch, termed the fence channel, at a junction formed by the outer edge and bottom surface, said fence channel extending along said bottom surface outer edge from near the fence proximal end to the fence distal end, said fence channel being adapted to engage said router stops.

8. A router guide apparatus as recited in claim 7, wherein:

said fixed fence is joined to the track by means of a fixed fence mount attached to the track top surface near to the track proximal end, said fixed fence mount having a generally rectangular shaped plate having an upper surface and a bottom surface, said mount bottom surface resting on the track top surface, said mount top surface having a cylindrical aperture, termed the rotation void, formed therein, said fixed fence mount having a longitudinal axis and being positioned so that said longitudinal axis is transverse to the longitudinal axis of the track, said fixed fence mount longitudinal axis being longer than the side-to-side width of the fence track top surface, said fixed fence mount being attached to the fence track top surface flush with track fence side, said fixed fence mount overhanging said fence track slot side, said fixed fence mount top surface having an upraised detent formed therein, said detent being located on the central longitudinal axis of the mount in a line from the center of the rotation void, said line being perpendicular to the track longitudinal axis, said detent being positioned on the track slot side overhang portion of the mount top surface.

9. A router guide apparatus as recited in claim 8, wherein:

said movable fence is joined to the track by means of a movable fence mount assembly, said assembly being comprised of a movable fence mount fixedly attached to a lock plate which is joined to a back plate by means of a fence lock, said movable fence mount having a generally rectangular shaped plate having an upper surface and a bottom surface, said mount bottom surface slidably resting on the track top surface, said mount top surface having a cylindrical aperture, termed the rotation void, formed therein, said movable fence mount having a longitudinal axis and being positioned so that said longitudinal axis is transverse to the longitudinal axis of the track, said movable fence mount longitudinal axis being longer than the side-to-side width of the fence track top surface, said movable fence mount being positioned on the track top surface flush with fence track fence side, said movable fence mount extending over the fence track slot side, said movable fence mount having an upraised detent formed therein, said detent being located on the central longitudinal axis of the movable fence mount in a line from the center of the rotation void, said line being perpendicular to the track longitudinal axis, said detent being positioned on the track slot side overhang portion of the movable mount top surface.

10. A router guide apparatus as recited in claim 9, wherein:

said moveable fence mount is fixedly attached to a lock plate and slideably positioned on the top surface of the fence track, said lock plate having a generally rectangular shape and a longitudinal axis parallel with the longitudinal axis of the track, said lock plate having a forward surface, a rearward surface, and a top side which defines the thickness of the lock plate, said lock plate being vertically positioned in a plane parallel to the track slot side, said lock plate rearward surface being positioned against the track slot side and having a vertical width wider than the vertical width of the track slot and approximately equal to the vertical width of the slot side, said movable plate track slot side overhang portion of the mount bottom surface being fixedly attached to the lock plate top side, said lock plate having a central hole formed through the thickness of the plate from the forward surface through to the rearward surface.

11. A router guide apparatus as recited in claim 10, wherein:

said back plate has a generally rectangular shape and a longitudinal axis parallel with the longitudinal axis of the track, said back plate having a forward surface, a rearward surface, a top side and a bottom side, said top and bottom sides defining the thickness of the back plate, said back plate being vertically positioned in a plane parallel to the track slot side within the track channel with a width small enough to fit flush between the inner surfaces of the track channel, said back plate forward surface being positioned against the track slot and having a vertical width greater than the vertical width of the slot.

12. A router guide apparatus as recited in claim 11, wherein:

said lock plate has a central hole formed through the thickness of the plate from the forward surface through to the rearward surface, said lock plate and back plate being joined by means of a fence lock.

13. A router guide apparatus as recited in claim 12, wherein:

said fence lock is comprised of a threaded shaft with two ends, a proximal end and a distal end, said distal end terminating in a locking head, wherein said shaft distal end is inserted through the lock plate hole from forward surface to rearward surface, whereby the locking head remains externally adjacent to the lock plate forward surface, said threaded shaft being positioned through the track slot, into and through the back plate hole from forward surface through to rearward surface, said fence lock being further comprised of a locking nut attached to the fence lock threaded shaft distal end thereby engaging the threaded shaft and being tightened so that the nut presses against the back plate rearward surface, the fence lock locking head being adapted to release pressure holding the back plate to the locking plate along the threaded shaft by manipulation of the locking head handle.

14. A router guide apparatus as recited in claim 13, wherein:

said fence lock slideably attaches the back plate and the lock plate to the track at a user defined position relative to the fixed fence mount, wherein the movable fence mount can be moved along the track when attached via the lock plate, the back plate and the fence lock, said lock plate being engaged against the track slot side of the track when the fence lock shaft is passed through the lock plate hole, the track slot, and the back plate hole, wherein said fence lock is engaged to hold the lock plate to the track slot side of the track.

15. A router guide apparatus as recited in claim 14, wherein:

said movable fence mount is fixedly attached to the upper end of the lock plate by means of two screws; and said fixed fence mount is fixedly attached to the track top surface by means of four screws.

16. A router guide apparatus as recited in claim 15, wherein:

said fixed fence and movable fence each have a rotation disk attached to its bottom surface near to its proximal end, each said rotation disk being a cylindrical plate with an outer diameter slightly smaller then the inner diameter of the fixed fence and movable fence rotation void, each said fence being joined to their respective mounts by insertion of its rotation disk into its rotation void and fastening each rotation disk into each said rotation void by means of a rotation screw inserted through each fence, through the center of its rotation disk, through the center of its rotation void into its respective fence mount, wherein said rotation screws rotatably attach said fences to said fence mounts.

17. A router guide apparatus as recited in claim 16, wherein:

each said fence bottom surface contains a plurality of detent holes arranged about the proximal side of the rotation disk between the disk and the fence proximal end, said detent holes being located at predetermined angular positions radially from the rotation disk center, wherein each said fence mount detent is aligned and inserted into one of said detent holes to set the fence in a desired angular position relative to the longitudinal axis of the track.

18. A router guide apparatus as recited in claim 17, wherein each said router stop is comprised of:

a flat, elongated, rectangular member having a top surface, bottom surface, inner edge, outer edge, first end, and second end, said first and second ends defining a longitudinal axis which is substantially longer than said member transverse axis which is defined by said inner and outer edges;

a first stop clamp attached to said member, said clamp having a rectangular block shape with a horizontal top surface, horizontal bottom surface, vertical interior side, and a vertical opposite exterior side, said stop clamp having a horizontal flange formed along its interior side at its bottom surface, said flange having a cross-sectional dimension slightly less than a cross-sectional dimension of the fixed and movable fence channels;

a second stop clamp attached to said member, said clamp having a rectangular block shape with a horizontal top surface, horizontal bottom surface, vertical interior side, and a vertical opposite exterior side, said stop clamp having a horizontal flange formed along its interior side at its bottom surface, said flange having a cross-sectional dimension slightly less than a cross-sectional dimension of the fixed and movable fence channels;

wherein the interior sides of the said first and second stop clamps are defined as those sides facing each other;

wherein the flange of the first stop clamp engages the fixed fence channel and the flange of the second stop clamp engages the movable fence channel.

19. A router guide apparatus as recited in claim 18, wherein:

each said stop clamp has a horizontal, generally rectangular slot cut through from the interior side to the exterior side, each said slot having a cross-sectional dimension slightly greater than a cross-sectional dimension of said member, said slots forming an opening for slideably engaging the member, each said stop clamp having a hole formed into their top surfaces down to the slot openings, said stop clamps each having an adjustment screw fitted into said hole for holding said member in a desired position.

20. A router guide apparatus as recited in claim 19, wherein:

said fence track top surface has measuring indicia formed in or on it for defining cut width, said measuring indicia being formed along the fence side of the top surface.

\* \* \* \* \*